United States Patent
Shah

(10) Patent No.: US 12,231,882 B2
(45) Date of Patent: Feb. 18, 2025

(54) REDUCING WIRELESS TELECOMMUNICATION NETWORK TRAFFIC BY DISTRIBUTING AUTHENTICATION CREDENTIALS AND SUBSCRIPTION PROFILES ACROSS MULTIPLE NETWORKS

(71) Applicant: T-Mobile USA, Inc., Bellevue, WA (US)

(72) Inventor: Mehul Shah, Bellevue, WA (US)

(73) Assignee: T-Mobile USA, Inc., Bellevue, WA (US)

(*) Notice: Subject to any disclaimer, the term of this patent is extended or adjusted under 35 U.S.C. 154(b) by 339 days.

(21) Appl. No.: 17/718,068

(22) Filed: Apr. 11, 2022

(65) Prior Publication Data

US 2023/0328522 A1    Oct. 12, 2023

(51) Int. Cl.
*H04W 12/062* (2021.01)
*H04W 8/12* (2009.01)
*H04W 8/20* (2009.01)

(52) U.S. Cl.
CPC ........... *H04W 12/062* (2021.01); *H04W 8/12* (2013.01); *H04W 8/20* (2013.01)

(58) Field of Classification Search
CPC ........ H04W 12/062; H04W 8/12; H04W 8/20
USPC ........ 455/433, 435.1, 432.1, 422.1, 410, 411
See application file for complete search history.

(56) References Cited

U.S. PATENT DOCUMENTS

| | | | |
|---|---|---|---|
| 7,039,431 | B2 | 5/2006 | Mukherjee |
| 7,116,646 | B1 | 10/2006 | Gustafson et al. |
| 7,627,341 | B2 | 12/2009 | Wu |
| 7,869,819 | B2 | 1/2011 | Noldus |
| 8,175,622 | B2 | 5/2012 | Jiang |
| 8,515,392 | B2 | 8/2013 | Chen et al. |
| 8,787,869 | B2 | 7/2014 | Watson et al. |
| 8,805,361 | B2 | 8/2014 | Kieselmann et al. |
| 8,849,249 | B2 | 9/2014 | Rishy-maharaj et al. |
| 9,154,944 | B2 | 10/2015 | El Hattachi |

(Continued)

FOREIGN PATENT DOCUMENTS

| | | |
|---|---|---|
| CN | 106717042 B | 11/2020 |
| EP | 1990968 A1 | 11/2008 |
| WO | 2016076628 A2 | 5/2016 |

*Primary Examiner* — Nghi H Ly
(74) *Attorney, Agent, or Firm* — Perkins Coie LLP

(57) ABSTRACT

The disclosed system obtains an international mobile subscriber identity (IMSI) range of multiple UEs operating on a first network. The system obtains a subscription profile and authentication credentials of a UE among the multiple UEs. The system stores the IMSI range, a first subscription profile, and the authentication credentials in a second database of a second network. The second network provides connectivity to the UE when the UE is outside the limited geographical range of the first network. The system receives a request from the UE to connect to the second network when the UE is outside the limited geographical range. The system reduces network traffic by authenticating the UE using the authentication credentials stored in the second database and determining that the service is authorized to be provided to the UE based on the subscription profile stored in the second database without communicating with the first network. Upon authenticating the UE, the system provides the service to the UE.

20 Claims, 6 Drawing Sheets

(56) References Cited

U.S. PATENT DOCUMENTS

| | | | |
|---|---|---|---|
| 9,173,093 | B2 | 10/2015 | Rishy-maharaj et al. |
| 9,565,297 | B2 | 2/2017 | Maes |
| 9,699,587 | B2 | 7/2017 | Cepuran et al. |
| 9,705,871 | B2 | 7/2017 | Engan et al. |
| 9,716,999 | B2 | 7/2017 | Zhang et al. |
| 9,763,168 | B1 | 9/2017 | Zait et al. |
| 9,883,384 | B2 | 1/2018 | Lee et al. |
| 10,034,165 | B2 | 7/2018 | Betti et al. |
| 10,039,151 | B1 | 7/2018 | Upp et al. |
| 10,321,303 | B1 | 6/2019 | Namiranian |
| 10,362,475 | B2 | 7/2019 | Namiranian |
| 10,531,419 | B2 | 1/2020 | Kunz et al. |
| 10,582,382 | B2 | 3/2020 | Chen et al. |
| 10,582,468 | B2 | 3/2020 | Britt et al. |
| 10,637,996 | B2 | 4/2020 | Kwok |
| 10,735,944 | B2 | 8/2020 | Syed et al. |
| 10,798,564 | B2 | 10/2020 | Namiranian |
| 10,820,200 | B2 | 10/2020 | Syed et al. |
| 11,184,356 | B1 | 11/2021 | Tandon et al. |
| 11,190,985 | B1 | 11/2021 | Indurkar |
| 2002/0110133 | A1 | 8/2002 | Bern |
| 2009/0011759 | A1 | 1/2009 | Alperovich et al. |
| 2009/0086672 | A1 | 4/2009 | Gholmieh et al. |
| 2009/0318124 | A1 | 12/2009 | Haughn |
| 2014/0162640 | A1 | 6/2014 | Zhu et al. |
| 2021/0029127 | A1 | 1/2021 | Stubblefield |
| 2022/0052753 | A1* | 2/2022 | Speidel ................ H04W 16/10 |
| 2022/0086621 | A1 | 3/2022 | Namiranian |

* cited by examiner

REDUCING WIRELESS TELECOMMUNICATION NETWORK TRAFFIC BY DISTRIBUTING AUTHENTICATION CREDENTIALS AND SUBSCRIPTION PROFILES ACROSS MULTIPLE NETWORKS

BACKGROUND

Traditionally, in 3GPP mobile networks, user equipment (UE) connectivity in an area where the UE's home network does not provide coverage is achieved by leveraging the roaming architecture where the UE can connect to a roaming network, and the roaming network can connect to the UE's home network using an intermediate internet protocol (IP) connectivity provider. This approach increases traffic in both the home and the roaming network because the roaming network needs to continually communicate with the home network to authenticate and provide services to the user.

BRIEF DESCRIPTION OF THE DRAWINGS

Detailed descriptions of implementations of the present invention will be described and explained through the use of the accompanying drawings.

Figure 1:
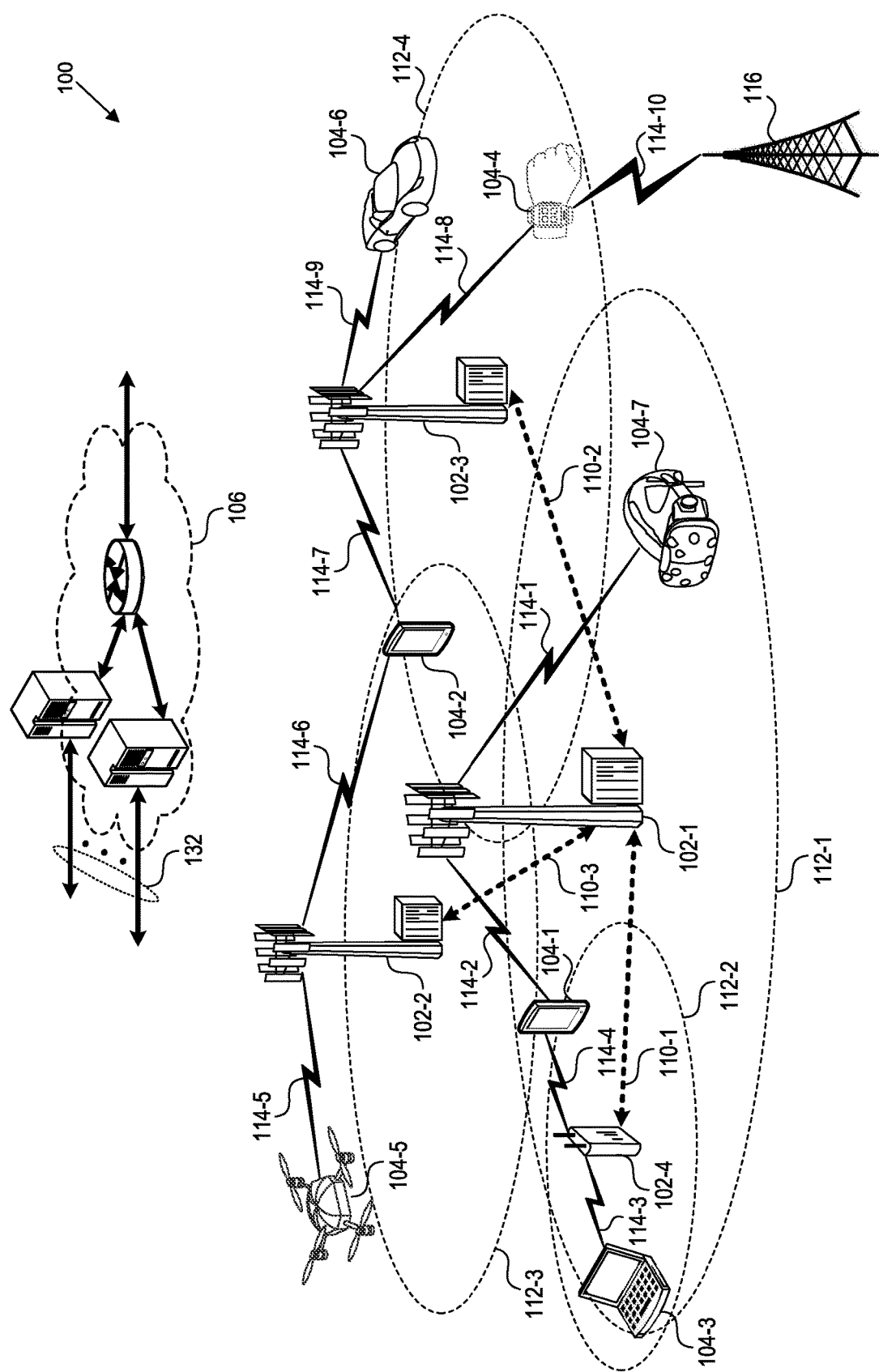
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Disclosed herein is a system and method to reduce wireless telecommunication traffic. The system can obtain an international mobile subscriber identity (IMSI) range associated with multiple mobile devices operating on a private network providing connectivity to the multiple mobile devices within a limited or defined geographical range. The system can obtain a subscription profile A and authentication credentials associated with the mobile device operating on the private network. The subscription profile indicates a service that is authorized to be provided to the mobile device, such as data, voice, messaging, etc. The authentication credentials are verified prior to providing the service to the mobile device. The system can store the IMSI range, a subscription profile B, and the authentication credentials in a database associated with a public wireless telecommunication network ("public network"). The subscription profile B is based on the subscription profile A. The subscription profile B can be the same as the subscription profile A, can include additional services that are available on the public network, or can exclude certain services contained in the subscription profile A. The public network can provide connectivity to the mobile device when the mobile device is outside the coverage provided by the private network. A public network means that the network is managed by a wireless telecommunications carrier, whereas a private network means that the network is limited to a campus, group of buildings, a particular geographical area such as 0.1 to 2 mile radius, etc. A private network is typically deployed in an enterprise and is dedicated to users within the enterprise. A private network can be a Citizens Broadband Radio Service (CBRS) network. There is no single piece of hardware that handles handoffs, rather separate 3GPP functions like the Mobility Management Entity (MME) and the signaling gateway (SGW) are used to handle different aspects of the handoff between a private and public network.

The system can receive a request from the mobile device to connect to the public network and provide a particular service when the mobile device is outside the limited or defined geographical range, e.g., when the mobile device is outside of the wireless coverage provided by the mobile device's home wireless network. The system can reduce wireless telecommunication network traffic by performing the steps described below. First, the system can authenticate the mobile device using the authentication credentials stored in the database without requesting authentication from the private network. Second, the system can determine whether the particular service is authorized to be provided to the mobile device based on the subscription profile B stored in the database without requesting the subscription profile from the private network. Upon authenticating the mobile device and determining that the particular service is authorized to be provided to the mobile device, the system can provide the service to the mobile device, by, for example, enabling the mobile device to communicate with a server of the private network via the public network.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "geographic coverage area 112" or collectively as "geographic coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet of Things (IoT), mobile broadband (MBB), vehicle-to-anything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. A small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (ARNR) connectivity 104-7; portable gaming consoles; wireless routers, gateways, modems, and other fixed-wireless access devices; wirelessly connected sensors that provide data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as user equipment (UE), customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions, while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

5G Core Network Functions

Figure 2:
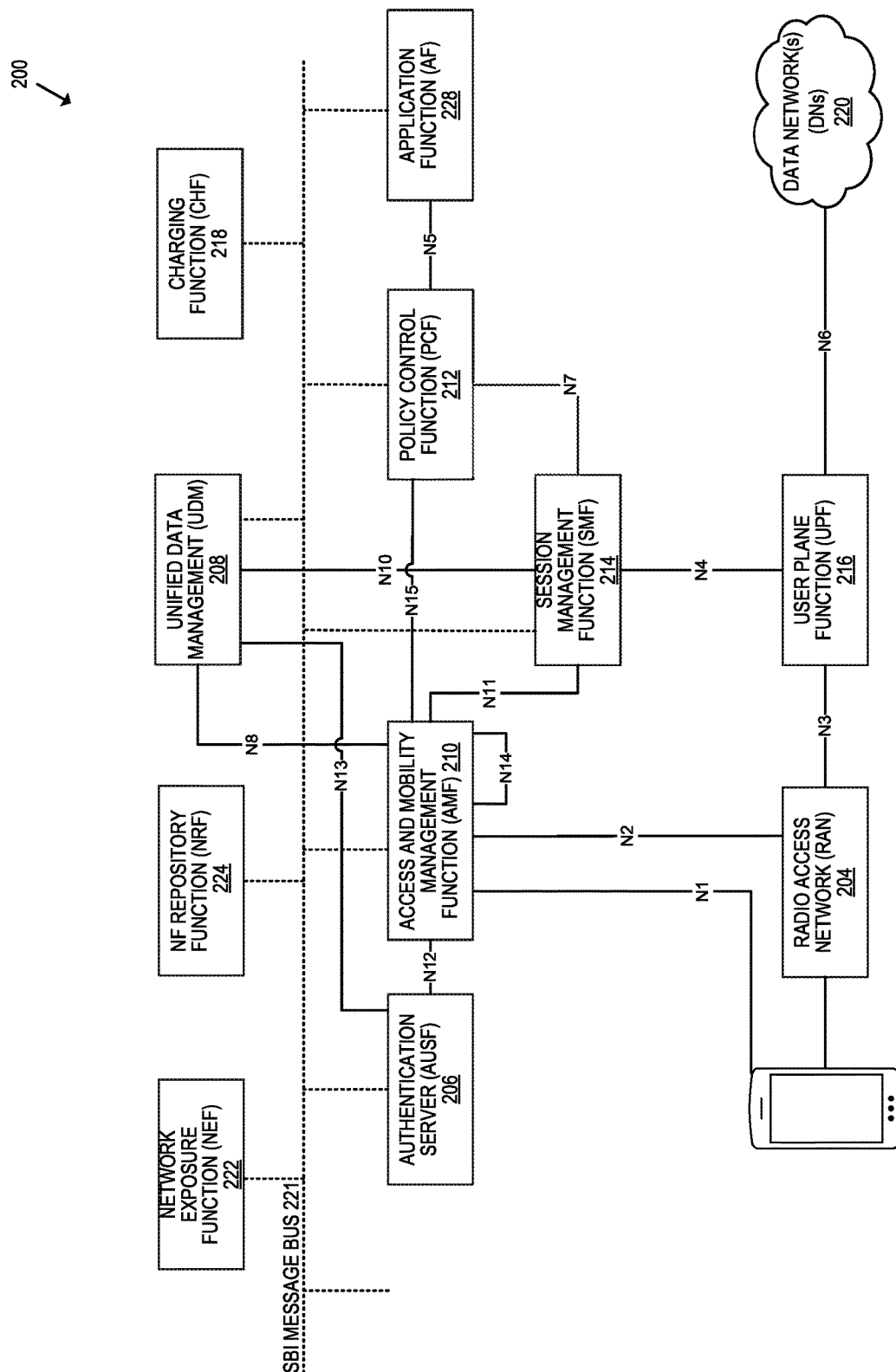
FIG. 2 is a block diagram that illustrates 5G core network functions that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a radio access network (RAN) 204. The NFs include an Authentication Server Function (AUSF) 206, a Unified Data Management (UDM) 208, an Access and Mobility Management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane, and the AMF 210, SMF 214, PCF 212, AUSF 206, and UDM 208 are part of the control plane. One or more UPFs can connect with one or more data networks (DNs) 220. The UPF 216 can be deployed separately from the control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, and service-level agreements, and it includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a data center, offloading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface, and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical Quality of Service (QoS) and charging rules, includes network slice selection, which is regulated by the NSSF 226.

Figure 3:
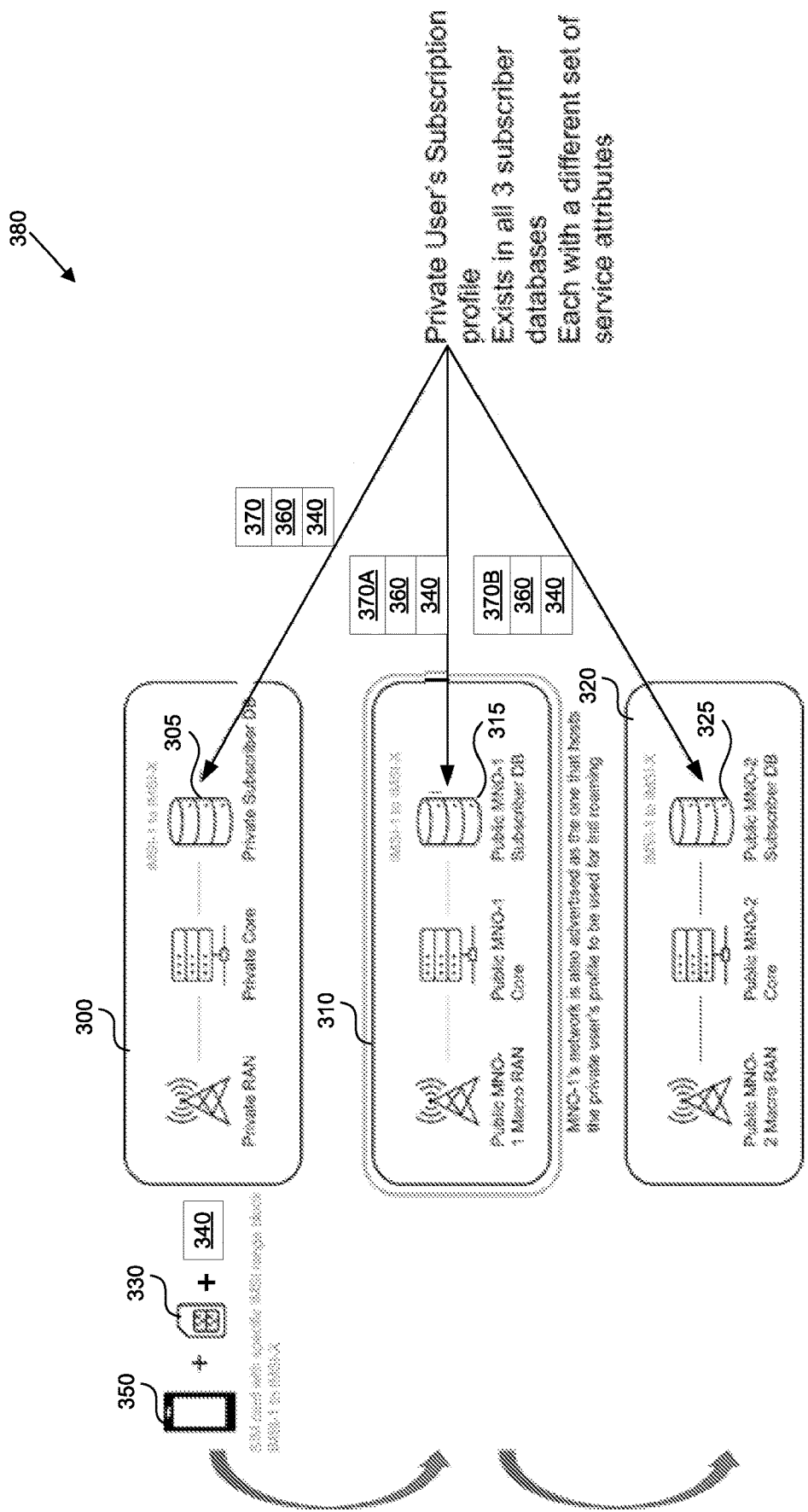
FIG. 3 shows a system to distribute authentication credentials, subscription profile, and the IMSI range to multiple wireless telecommunication networks.

Reducing Wireless Telecommunication Network Traffic by Distributing Authentication Credentials and Subscription Profiles Across Multiple Networks FIG. 3 shows a system 380 to distribute authentication credentials, subscription profile, and the IMSI range to multiple wireless telecommunication networks. An increasing number of private wireless telecommunication networks ("private networks") 300 are being deployed by enterprises. The private networks 300 can include tens of thousands of users and can provide limited geographical coverage, e.g., to within the enterprise's campus. When the UE 350 that is primarily served by the private network leaves the enterprise, the UE needs to be served by public wireless telecommunication networks ("public networks") 310, 320. The private network 300 and the public networks 310, 320 can each be the network 100 in FIG. 1. In some embodiments, the networks 300, 310, 320 can all be distinct public networks.

Traditionally, in 3GPP mobile networks, such connectivity over multiple networks is achieved by leveraging the roaming architecture where a single subscriber identity module (SIM) 330 can connect over both networks, which are interconnected using an intermediate IP connectivity provider such as an Internetwork Packet Exchange (IPX). This approach increases traffic in all networks 300, 310, 320 because it necessitates that the public networks 310, 320 obtain authentication information from the user, send the authentication information to the private network 300, and obtain approval from the private network. In addition, the public networks 310, 320 also need to obtain approval to provide a particular service to the UE 350 based on the subscription profile stored on the private network 300.

This disclosure proposes a method by which connectivity between the private and public networks is not required to achieve mobility across both networks. Specifically, the private UE subscription resides not only in the private network subscriber database 305 (such as the HSS/UDM) but also in the subscriber databases 315, 325 of the public networks 310, 320, respectively, which obviates the need for interconnecting these networks. The private user subscription can include the IMSI 340 of the UE 350, the authentication credentials 360, and subscription profile 370. When the UE 350 moves outside of the private network 300 coverage, the subscription profile 370 and authentication credentials 360 are locally available on the public network, which can provide connectivity to the UE.

The subscription profile 370 can exist in the subscriber databases 315, 325 of multiple public networks 310, 320. The distribution of the subscription profile 370 across multiple public networks 310, 320 enables the UE 350 to roam on an alternate public network 320 in case there is an outage on the primary public network 310. In addition, the subscription profiles 370A, 370B that exist in the public networks 310, 320 need not have the same attributes as the subscription profile 370, because the UE 350 may want to use additional services available on the public networks 310, 320 such as voice, messaging, or other value-added services.

Additionally, a specific subscriber database 315 that exists on the public network 310 may be designated as the "primary profile." The primary profile is advertised in industry documents such as the GSMA's IR.21. Typically the mobile country code (MCC)/mobile network codes (MNC), which together indicate public land mobile network (PLMN), of the IMSIs used for the private networks is the one advertised in the industry documents. In other words, when a private network user roams on, the foreign network performs IMSI analysis and then routes the authentication signaling outside of its network. The GPRS roaming exchange (GRX)/IPX provider then routes the signaling to the home location register (HLR)/HSS of the network that has advertised (in IR.21) that it 'owns' this IMSI range.

The private network 300 can use SIM cards 330 from a specific IMSI range, for instance 311 660 xxx yyy zzz to 311 660 aaa bbb ccc. This IMSI range is loaded in the private network subscriber database 305 and is associated with the subscription profile 370, including a particular set of service attributes, such as data-only. This means that the private network UEs are provisioned for data-only services within the private network 300.

The same private IMSI 340 range can also be stored in the database 315 with the subscription profile 370A having a different set of service attributes, such as data, voice, messaging, and mission-critical push-to-talk (MC-PTT), which means that the UE 350 has access to data, voice, messaging, and MC-PTT services when under the coverage of the network 310. MC-PTT refers to a push-to-talk product functionality that meets the requirements for public safety mission-critical voice communication. Further, network 310 can be configured to route authentication requests from the range of private IMSIs 340 to the database 315 associated with the network 310. Consequently, the network 310 can authenticate the UE 350 by itself, without having to communicate with the network 300. In other words, inter-network connectivity (such as from an IPX) between the network 310 and network 300 is not required to authenticate the UE 350 and offer connectivity. The UE 350 can be a "guest" user on the network 310. A guest user is a transient user and not a regular user of the network. For instance, in the T-Mobile network a 'regular' user is one that has the T-Mobile SIM card and a 'guest' user is someone who roams into the T-Mobile network temporarily (say a user from one of T-Mobile's roaming partners).

The network 310 can contain the subscription profile 370A, which is designated as the primary profile. Because the network 310 contains the primary profile, the network 310 can advertise the private IMSI 340 range in the IR.21 document, which informs the other networks that they need to contact the database 315 when the UE 350, whose IMSI is included in the IMSI 340 range, is roaming on other networks.

Similarly, the network 320 can store the same private IMSI 340 range in the database 325, along with the authentication credentials 360 and the subscription profile 370B, which can include yet another set of service attributes, such as data or voice. Consequently, when the UE 350 is under the coverage of the network 320, the UE has access to both voice and data.

The system 380 can be deployed in various scenarios. For example, a logistics and package delivery enterprise can create the network 300. Endpoint A (e.g., a handheld package scanning device) can be used under coverage of the private network 100 when packages are being handled in a warehouse. Also, endpoint A can be used by the delivery driver when packages are being delivered to the recipient. The endpoint A can be the UE 350. When the endpoint A is scanning the package upon delivery, the endpoint A can connect to the network 310, whereupon the network 310 authorizes the connection of the endpoint A to the network. When the endpoint A connects to the network 310, the network 310 can act as a mediator between endpoint A and the private network 300. For example, the network 310 can send the information that the package with a particular ID 123QWE has been delivered to the network 300, which can store the information on a server within the network 300.

In a second example, a corporation such as Google can provide a private network 300 to its employees who have laptops (or other connected devices) that are connected over the private network when inside office campuses. The laptop can be the UE 350. When the laptop leaves the office campus, the laptop can connect to the public network 310, which can then facilitate a connection to the private network 300.

In a third example, the public networks 310, 320 can be 5G networks, while the network 300 can be a lower-generation network, such as a 4G network. The 5G networks 310, 320 can provide services that the 4G network cannot provide, such as augmented reality (AR)/virtual reality (VR) services. Consequently, even though the network 300 can provide service at a particular UE location, the UE 350 can switch to the 5G networks 310, 320. The subscription profile stored in the 5G networks can indicate to provide AR/VR services to the UE 350. One application of the AR/VR services is in construction, where a construction worker can go to a construction site and receive an AR/VR view of the site at a more advanced stage of the construction.

The UE 350 can be a vehicle, such as an aerial vehicle, a terrestrial vehicle, or a marine vehicle. The vehicle can be semiautonomous or autonomous. For example, the manufacturer of the vehicle can create its own IMSI 340 range, e.g., under the Telecommunication Standardization Sector (ITU-T) non-mobile-network-operator IMSI range under the 901 MCC. The ITU-T non-mobile-network-operator IMSI range is a range of IMSI codes that are supported by the international mobile shared codes and that are not dedicated to the mobile network operators. Instead, the IMSI codes can be dedicated to vehicle manufacturers.

The manufacturer can distribute the IMSI 340 range to all the major public networks 310, 320 in specific geographical areas, e.g., the three Tier 1 carriers in the United States, and request that each carrier store and use the same IMSI code for each vehicle, and the same authentication credentials. The three Tier 1 carriers in the United States include AT&T, Verizon and T-Mobile. The subscriber profile can vary between the different networks 310, 320. For example, each network 310, 320 can provide a discrete set of services to the vehicle, such as business-to-business services on network 310, or business-to-business and vehicle-to-anything services on network 320, etc.

Without requesting the networks 310, 320 to use the same IMSI codes, each vehicle would have to have a separate IMSI code for each network, meaning that each vehicle would have to have a SIM card for each network and authentication credentials for each network. In addition, the networks 310, 320 would have to communicate with each other to authenticate the vehicle. By storing the same IMSI code across all networks 310, 320 and the same authentication credentials across all networks, the system 380 reduces network traffic on networks 310, 320, and enables the vehicle to contain only a single SIM card.

Figure 4:
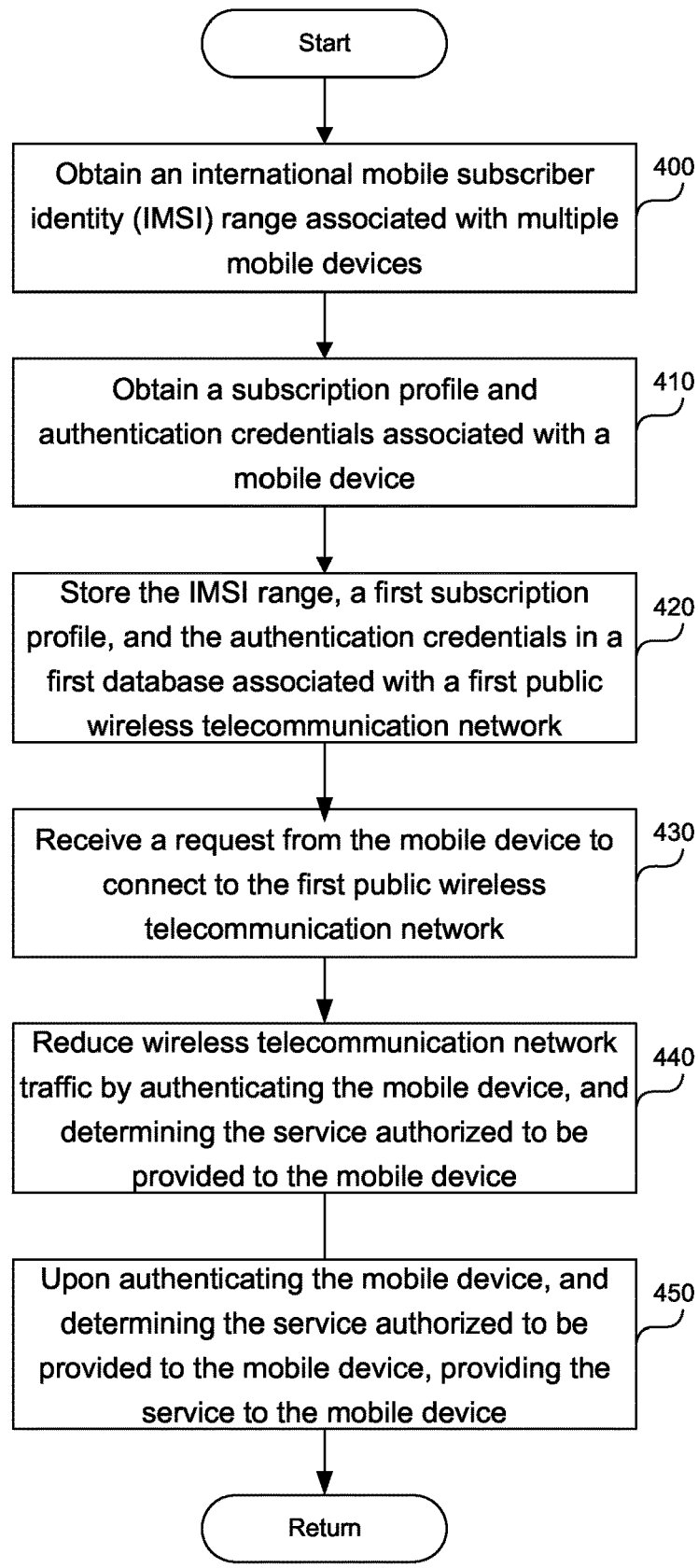
FIG. 4 is a flowchart of a method to reduce wireless telecommunication network traffic by distributing authentication credentials and subscription profiles across multiple networks, according to one embodiment.

FIG. 4 is a flowchart of a method to reduce wireless telecommunication network traffic by distributing authentication credentials and subscription profiles across multiple networks, according to one embodiment. The wireless telecommunication network can be a cellular telecommunication network. A hardware or a software processor executing instructions described in this application, in step 400, can obtain an IMSI range associated with multiple mobile devices operating on a private wireless telecommunication network providing connectivity to the multiple mobile devices within a limited geographical range, such as an enterprise campus, a university campus, particular set of buildings, or an area that a UE is likely to exit during daily activity.

The IMSI is a number that uniquely identifies every user of a cellular network. It is stored as a 64-bit field and is sent by the mobile device to the network. The IMSI is used in any mobile network that interconnects with other networks and can be stored in the SIM card of the UE.

In step 410, the processor can obtain a subscription profile associated with a mobile device among the multiple mobile devices operating on the private wireless telecommunication network and authentication credentials associated with the mobile device operating on the private wireless telecommunication network. The subscription profile can indicate a service authorized to be provided to the mobile device, such as data, voice, messaging, and/or MC-PTT. The authentication credentials are verified prior to a network providing the service to the mobile device.

In step 420, the processor can store the IMSI range, a first subscription profile, and the authentication credentials in a first database associated with a first public wireless telecommunication network. The first public wireless telecommunication network can provide connectivity to the mobile device when the mobile device is outside the limited geographical range. In some embodiments, the private wireless telecommunication network can also offer public wireless communication services over a wide geographical range; however, the private and the public wireless telecommunication networks can provide varying coverage, and the UE can be in an area where only the public wireless telecommunication network provides coverage.

The first subscription profile is based on the subscription profile associated with the mobile device, e.g., the first subscription profile can be a modified version of the subscription profile as explained in connection with FIG. 3. For example, the processor can modify the subscription profile associated with the private wireless telecommunication network by modifying the service authorized to be provided to the mobile device to obtain the first subscription profile, such as by adding or removing the service. The processor can store the first subscription profile in the first database. For example, the subscription profile can provide for data service, while the first subscription profile can provide for both data and voice service.

In step 430, the processor can receive a request from the mobile device to connect to the first public wireless telecommunication network when the mobile device is outside the limited geographical range served by the private communication network.

In step 440, the processor can reduce wireless telecommunication network traffic by performing the following steps. The wireless telecommunication network traffic can include control traffic as well as data. First, the processor can authenticate the mobile device using the authentication credentials stored in the first database without requesting authentication from the private wireless telecommunication network. Second, the processor can determine that the service is authorized to be provided to the mobile device based on the subscription profile stored in the first database without requesting the subscription profile from the private wireless telecommunication network.

In step 450, the processor can, upon authenticating the mobile device and determining that the service is authorized to be provided to the mobile device, provide the service to the mobile device. For example, the first public wireless telecommunication network can facilitate communication between the UE and a server of the private network.

The processor can designate the first subscription profile to be the primary profile by enabling roaming based on the first subscription profile. The processor can define a roaming profile associated with the mobile device. The processor can store the roaming profile in the first database. Due to designating the first subscription profile to be the primary profile, the processor receives, at the first public wireless telecommunication network, a request to approve a service requested by the mobile device from a second wireless telecommunication network. In other words, the mobile device can be roaming and requesting service from the second wireless telecommunication network. The processor can determine whether to provide the service based on the roaming profile associated with the mobile device. Upon determining that the service requested is included in the roaming profile, the processor can approve the service requested.

The processor can cause a second public wireless telecommunication network to store the IMSI range and the authentication credentials in a second database associated with the second public wireless telecommunication network, where the second public wireless telecommunication network provides connectivity to the mobile device when the mobile device is outside the limited geographical range and outside the coverage provided by the first public wireless telecommunication network. The second public wireless telecommunication network can be configured to modify the subscription profile associated with the private wireless telecommunication network to obtain a second subscription profile. The second public wireless telecommunication network can be configured to store the second subscription profile in the second database.

The processor can designate the first subscription profile to be the primary profile by enabling roaming based on the first subscription profile. To enable roaming, the processor can receive, at the first public wireless telecommunication network, a request to approve a service requested by the mobile device from a second wireless telecommunication network, where the second wireless telecommunication network is the roaming network. The processor can determine whether to approve the service requested based on the first subscription profile associated with the mobile device. Upon determining that the service requested is included in the first subscription profile, the processor can approve the service requested.

The processor can determine that the first public wireless telecommunication network cannot provide service to the mobile device. The processor can provide service to the mobile device using the second public wireless telecommunication network based on information stored in the second database.

The technology described in this application can apply to UEs including vehicles such as terrestrial, aerial, or marine vehicles. The vehicles can be semiautonomous or fully autonomous. The vehicles need to be configured to connect to a wireless telecommunication network, for example via a SIM card. The processor can obtain the IMSI range associated with multiple vehicles configured to communicate over the wireless telecommunication network, where the IMSI range is defined by the vehicle manufacturer. The processor can obtain multiple subscription profiles associated with multiple public wireless telecommunication networks. The first subscription profile among the multiple subscription profiles can be associated with the first wireless telecommunication network among the multiple wireless telecommunication networks. The first subscription profile can authorize business-to-business services on the personal communication network. A second subscription profile among the multiple subscription profiles can authorize business-to-business services and vehicle-to-anything services on a second telecommunication network. The processor can store the IMSI range, the first subscription profile, and the authentication credentials in the second database associated with the second public wireless telecommunication network. The processor can store the IMSI range, the second subscription profile, and the authentication credentials in a third database associated with the third wireless telecommunication network.

Figure 5:
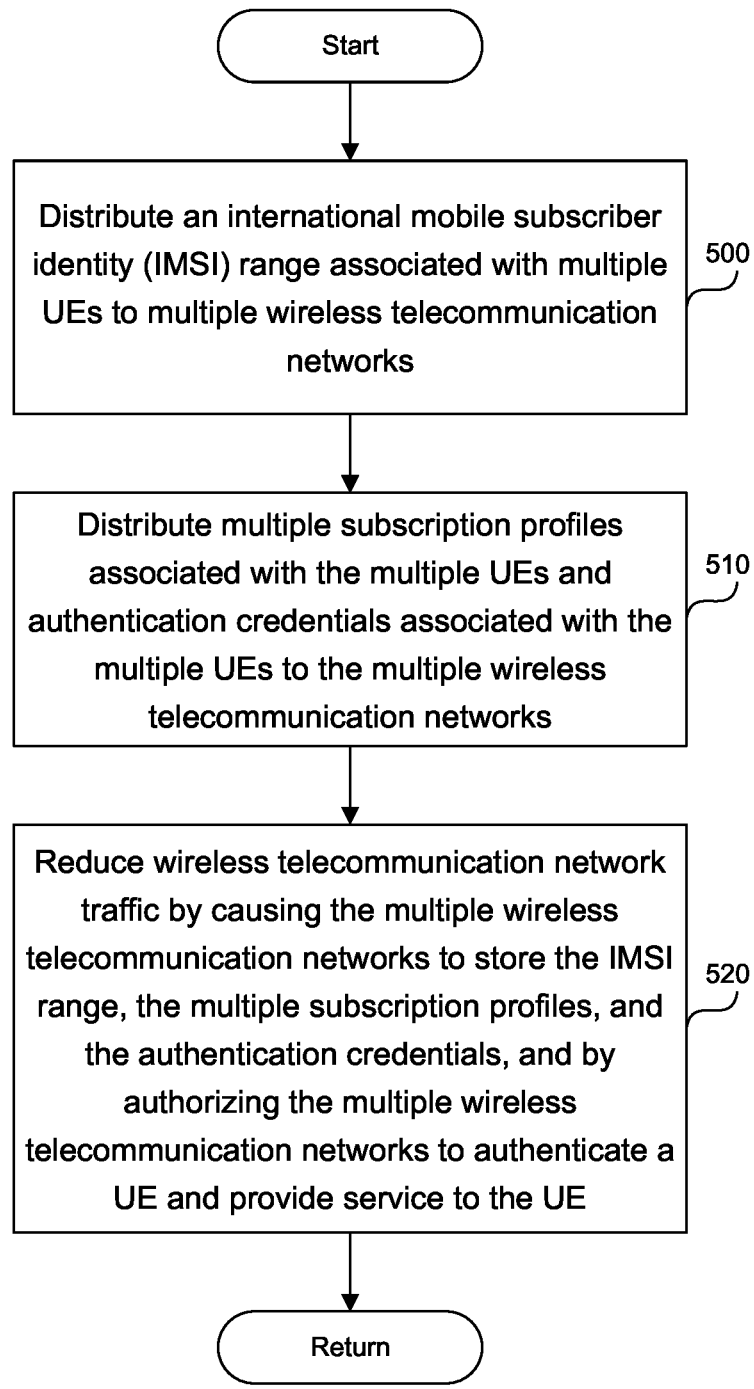
FIG. 5 is a flowchart of a system to reduce wireless telecommunication network traffic by distributing authentication credentials and subscription profiles across multiple networks, according to another embodiment.

FIG. 5 is a flowchart of a system to reduce wireless telecommunication network traffic by distributing authentication credentials and subscription profiles across multiple networks, according to another embodiment. In step 500, the processor can distribute an IMSI range associated with multiple UEs to multiple wireless telecommunication networks. A wireless telecommunication network among multiple wireless telecommunication networks provides a coverage in a different area than other wireless telecommunication networks.

In step 510, the processor can distribute multiple subscription profiles associated with the multiple UEs and authentication credentials associated with the multiple UEs to the multiple wireless telecommunication networks. A subscription profile among the multiple subscription profiles indicates a service authorized to be provided to the UE, such as data, voice, messaging, or MC-PTT. The authentication credentials are verified prior to providing the service to the UE.

In step 520, the processor can reduce wireless telecommunication network traffic by performing the following steps. First, the processor can cause the multiple wireless telecommunication networks to store the IMSI range, the multiple subscription profiles, and the authentication credentials in multiple databases associated with the multiple wireless telecommunication networks. Second, the processor can authorize the multiple wireless telecommunication networks to authenticate a UE and provide service to the UE based on information stored in multiple databases, without necessarily communicating with each other or a third network.

To reduce wireless telecommunication network traffic, the processor can cause a wireless telecommunication network among the multiple wireless telecommunication networks to receive a request from the UE to connect to the first public wireless telecommunication network when the UE is roaming. The processor can cause the wireless telecommunication network to authenticate the UE using the authentication credentials stored in a database associated with the wireless telecommunication network. The processor can cause the wireless telecommunication network to determine whether the service is authorized to be provided to the UE based on the subscription profile stored in the first database. The processor can cause the wireless telecommunication network to, upon authenticating the UE and determining that the service is authorized to be provided to the UE, provide the service to the UE, by for example communicating with the server of the private network.

The processor can designate a subscription profile among the multiple subscription profiles to be the primary profile by enabling roaming based on the subscription profile. The subscription profile can be stored by a wireless telecommunication network among the multiple wireless telecommunication networks. The wireless telecommunication network can be configured to receive a request to approve a service requested by the UE from another wireless telecommunication network. The wireless telecommunication network can be configured to determine whether to provide the service requested based on the roaming profile associated with the UE. The wireless telecommunication network can be configured to, upon determining that the service requested is included in the roaming profile, approve the service requested.

The processor can authorize a wireless telecommunication network among the multiple wireless telecommunication networks to modify the subscription profile associated with the wireless telecommunication network by modifying the service authorized to be provided to the UE to obtain the modified subscription profile. The processor can authorize the wireless telecommunication network to store the modified subscription profile in a database.

The processor can define an IMSI range associated with multiple vehicles configured to communicate over the wireless telecommunication network. The vehicle can be a terrestrial vehicle, a marine vehicle, an aerial vehicle, etc., as long as the vehicles are configured to communicate with a wireless communication network, such as through a SIM card. The processor can distribute the IMSI range to the multiple wireless telecommunication networks. The processor can distribute the multiple subscription profiles associated with multiple public wireless telecommunication networks. A first subscription profile among the multiple subscription profiles can be associated with the first wireless telecommunication network among the multiple wireless telecommunication networks, while the second subscription profile can be associated with a second wireless telecommunication network. The first subscription profile can authorize business-to-business services on the personal communication network, while a second subscription profile among the multiple subscription profiles can authorize business-to-business services and vehicle-to-anything services on a second telecommunication network.

Computer System

Figure 6:
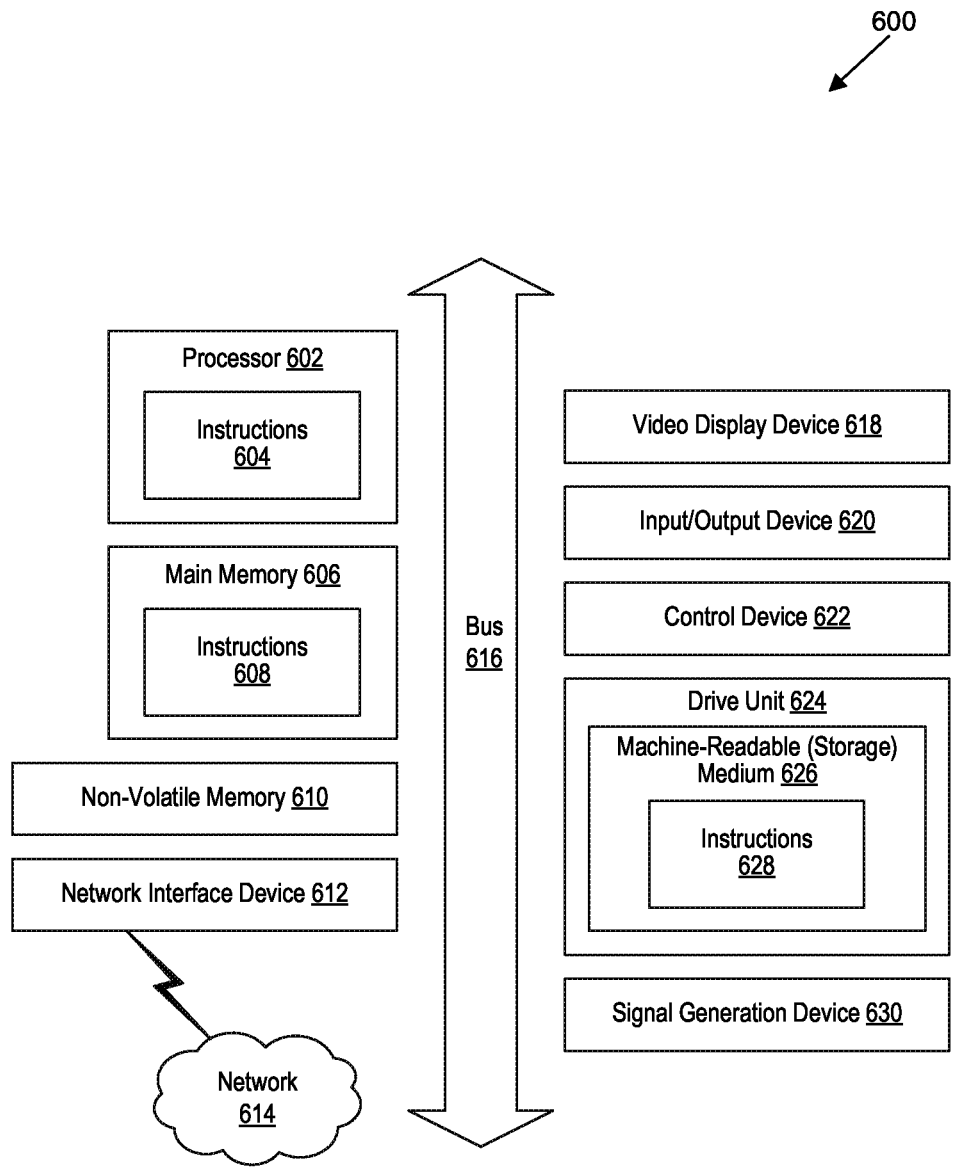
FIG. 6 is a block diagram that illustrates an example of a computer system in which at least some operations described herein can be implemented.

FIG. 6 is a block diagram that illustrates an example of a computer system 600 in which at least some operations described herein can be implemented. As shown, the computer system 600 can include one or more processors 602, main memory 606, non-volatile memory 610, a network interface device 612, a video display device 618, an input/output device 620, a control device 622 (e.g., keyboard and pointing device), a drive unit 624 that includes a machine-readable storage medium 626, and a signal generation device 630, all of which are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the Figures and any other components described in this specification can be implemented.

The computer system 600 can take any suitable physical form. For example, the computing system 600 can share an architecture similar to that of a server computer, a personal computer (PC), a tablet computer, a mobile telephone, a game console, a music player, a wearable electronic device, a network-connected ("smart") device (e.g., a television or home assistant device), an AR/VR system (e.g., a head-mounted display), or any electronic device capable of executing a set of instructions that specify action(s) to be taken by the computing system 600. In some implementations, the computer system 600 can be an embedded computer system, a system-on-chip (SOC), a single-board computer system (SBC), or a distributed system such as a mesh of computer systems, or it may include one or more cloud components in one or more networks. Where appropriate, one or more computer systems 600 can perform operations in real time, near real time, or in batch mode.

The network interface device 612 enables the computing system 600 to mediate data in a network 614 with an entity that is external to the computing system 600 through any communication protocol supported by the computing system 600 and the external entity. Examples of the network interface device 612 include a network adaptor card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 606, non-volatile memory 610, machine-readable storage medium 626) can be local, remote, or distributed. Although shown as a single medium, the machine-readable storage medium 626 can include multiple media (e.g., a centralized/distributed database and/or associated caches and servers) that store one or more sets of instructions 628. The machine-readable storage medium 626 can include any medium that is capable of storing, encoding, or carrying a set of instructions for execution by the computing system 600. The machine-readable storage medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices, removable flash memory, hard disk drives, optical disks, and transmission-type media, such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instructions cause the computing system 600 to perform operations to execute elements involving the various aspects of the disclosure.

Remarks

The terms "example," "embodiment," and "implementation" are used interchangeably. For example, references to "one example" or "an example" in the disclosure can be, but are not necessarily, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples, such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. At least one computer-readable storage medium, excluding transitory signals and carrying instructions to reduce cellular telecommunication network traffic, which, when executed by at least one data processor of a system, cause the system to:
    obtain an international mobile subscriber identity (IMSI) range associated with multiple mobile devices operating on a private cellular telecommunication network providing connectivity to the multiple mobile devices within a limited geographical range;
    obtain a) a subscription profile associated with a mobile device among the multiple mobile devices operating on the private cellular telecommunication network, and b) authentication credentials associated with the mobile device operating on the private cellular telecommunication network,
        wherein the subscription profile indicates a service authorized to be provided to the mobile device, and
        wherein the authentication credentials are verified prior to providing the service to the mobile device;
    store the IMSI range, a first subscription profile, and the authentication credentials in a first database associated with a first public cellular telecommunication network,
        wherein the first subscription profile is based on the subscription profile, and
        wherein the first public cellular telecommunication network provides connectivity to the mobile device when the mobile device is outside the limited geographical range;
    receive a request from the mobile device to connect to the first public cellular telecommunication network,
        wherein the mobile device is outside the limited geographical range;
    reduce the cellular telecommunication network traffic by:
        obviating the need to initially connect to the private cellular telecommunications network by authenticating the mobile device using the authentication credentials stored in the first database of the first public cellular telecommunications network without requesting authentication from the private cellular telecommunication network; and
determining that the service is authorized to be provided to the mobile device based on the first subscription profile stored in the first database without requesting the subscription profile from the private cellular telecommunication network; and
upon authenticating the mobile device and determining that the service is authorized to be provided to the mobile device, provide the service to the mobile device.

2. The computer-readable medium of claim 1, comprising instructions to:
designate the first subscription profile to be a primary profile by enabling roaming based on the first subscription profile;
define a roaming profile associated with the mobile device;
store the roaming profile in the first database;
due to designating the first subscription profile to be the primary profile, receive, at the first public cellular telecommunication network, a request to approve a service requested by the mobile device from a second cellular telecommunication network;
determine whether to provide the service requested based on the roaming profile associated with the mobile device; and
upon determining that the service requested is included in the roaming profile, approve the service requested.

3. The computer-readable medium of claim 1, comprising instructions to:
cause a second public cellular telecommunication network to store the IMSI range and the authentication credentials in a second database associated with the second public cellular telecommunication network,
wherein the second public cellular telecommunication network provides connectivity to the mobile device when the mobile device is outside the limited geographical range and outside coverage provided by the first public cellular telecommunication network,
wherein the second public cellular telecommunication network is configured to modify the subscription profile associated with the private cellular telecommunication network to obtain a second subscription profile, and
wherein the second public cellular telecommunication network is configured to store the second subscription profile in the second database.

4. The computer-readable medium of claim 1, comprising instructions to:
designate the first subscription profile to be a primary profile by enabling roaming based on the first subscription profile,
wherein enabling roaming includes:
receiving, at the first public cellular telecommunication network, a request to approve a service requested by the mobile device from a second cellular telecommunication network;
determining whether to approve the service requested based on the first subscription profile associated with the mobile device; and
upon determining that the service requested is included in the first subscription profile, approving the service requested.

5. The computer-readable medium of claim 1, comprising instructions to:
modify the subscription profile associated with the private cellular telecommunication network by modifying the service authorized to be provided to the mobile device to obtain the first subscription profile,
wherein the private network is associated with a corporation's campus having multiple buildings in proximity to each other, and
wherein the corporation is unrelated to a cellular telecommunication provider managing the first public cellular telecommunication network; and
store the first subscription profile in the first database.

6. The computer-readable medium of claim 1, comprising instructions to:
determine that the private cellular telecommunication network cannot provide service to the mobile device; and
provide service to the mobile device using the first public cellular telecommunication network based on information stored in the first database.

7. The computer-readable medium of claim 1, comprising instructions to:
obtain the IMSI range associated with multiple vehicles configured to communicate over a cellular telecommunication network, wherein the IMSI range is defined by a vehicle manufacturer;
obtain multiple subscription profiles associated with multiple public cellular telecommunication networks,
wherein the first subscription profile authorizes business-to-business services on the first public cellular telecommunication network, and
wherein a second subscription profile among the multiple subscription profiles authorizes business-to-business services and vehicle-to-anything services on a second public cellular telecommunication network; and
store the IMSI range, the first subscription profile, and the authentication credentials in the first database associated with the first public cellular telecommunication network.

8. A system comprising:
at least one hardware processor; and
at least one non-transitory memory storing instructions, which, when executed by the at least one hardware processor, cause the system to:
obtain an international mobile subscriber identity (IMSI) range associated with multiple UEs operating on a first wireless telecommunication network providing connectivity to the multiple UEs;
obtain a subscription profile associated with a UE among the multiple UEs operating on the first wireless telecommunication network and authentication credentials associated with the UE operating on the first wireless telecommunication network,
wherein the subscription profile indicates a service authorized to be provided to the UE, and
wherein the authentication credentials are verified prior to providing the service to the UE;
store the IMSI range, a first subscription profile, and the authentication credentials in a second database associated with a second wireless telecommunication network,
wherein the first subscription profile is based on the subscription profile, and
wherein the second wireless telecommunication network provides connectivity to the UE when the UE is outside coverage provided by the first wireless telecommunication network;

receive a request from the UE to connect to the second wireless telecommunication network,
  wherein the UE is outside the coverage provided by the first wireless telecommunication network;
reduce wireless telecommunication network traffic by:
  obviating the need to connect to the first wireless telecommunication network by authenticating the UE using the authentication credentials stored in the second database of the second wireless telecommunication network without requesting authentication from the first wireless telecommunication network; and
  determining that the service is authorized to be provided to the UE based on the first subscription profile stored in the second database without requesting the subscription profile from the first wireless telecommunication network; and
upon authenticating the UE and determining that the service is authorized to be provided to the UE, provide the service to the UE.

9. The system of claim 8, comprising instructions to:
designate the first subscription profile to be a primary profile by enabling roaming based on the first subscription profile;
define a roaming profile associated with the UE;
store the roaming profile in the second database;
due to designating the first subscription profile to be the primary profile, receive, at the second wireless telecommunication network, a request to approve a service requested by the UE from the second wireless telecommunication network;
determine whether to provide the service requested based on the roaming profile associated with the UE; and
upon determining that the service requested is included in the roaming profile, approve the service requested.

10. The system of claim 8, comprising instructions to:
cause a third wireless telecommunication network to store the IMSI range and the authentication credentials in a third database associated with the third wireless telecommunication network,
  wherein the third wireless telecommunication network provides connectivity to the UE when the UE is outside the coverage provided by the first wireless telecommunication network and outside coverage provided by the second wireless telecommunication network,
  wherein the third wireless telecommunication network is configured to modify the subscription profile associated with the first wireless telecommunication network to obtain a second subscription profile, and
  wherein the third wireless telecommunication network is configured to store the second subscription profile in the third database.

11. The system of claim 8, comprising instructions to:
designate the first subscription profile to be a primary profile by enabling roaming based on the first subscription profile,
  wherein enabling roaming includes:
    receiving, at the second wireless telecommunication network, a request to approve a service requested by the UE from a third wireless telecommunication network;
    determining whether to approve the service requested based on the first subscription profile associated with the UE; and
    upon determining that the service requested is included in the first subscription profile, approving the service requested.

12. The system of claim 8, comprising instructions to:
modify the subscription profile associated with the first wireless telecommunication network by modifying the service authorized to be provided to the UE to obtain the first subscription profile; and
store the first subscription profile in the second database.

13. The system of claim 8, comprising instructions to:
determine that the first wireless telecommunication network cannot provide service to the UE; and
provide service to the UE using the second wireless telecommunication network based on information stored in the second database.

14. The system of claim 8, comprising instructions to:
obtain the IMSI range associated with multiple vehicles configured to communicate over a wireless telecommunication network;
obtain multiple subscription profiles associated with multiple wireless telecommunication networks,
  wherein the first subscription profile authorizes business-to-business services on the second wireless telecommunication network among the multiple wireless telecommunication networks, and
  wherein a second subscription profile among the multiple subscription profiles authorizes business-to-business services and vehicle-to-anything services on a third wireless telecommunication network among the multiple wireless telecommunication networks; and
store the IMSI range, the first subscription profile, and the authentication credentials in the second database associated with the second wireless telecommunication network.

15. The system of claim 8, wherein the first wireless telecommunication network comprises a private wireless telecommunication network providing connectivity to the multiple UEs within a limited geographical range, and the second wireless telecommunication network and a third wireless telecommunication network comprise public wireless telecommunication networks providing connectivity in a range larger than the limited geographical range.

16. A system comprising:
at least one hardware processor; and
at least one non-transitory memory storing instructions, which, when executed by the at least one hardware processor, cause the system to:
  distribute an international mobile subscriber identity (IMSI) range associated with multiple UEs to multiple wireless telecommunication networks,
    wherein a wireless telecommunication network among the multiple wireless telecommunication networks provides a coverage in a different area than other wireless telecommunication networks;
  distribute multiple subscription profiles associated with the multiple UEs and authentication credentials associated with the multiple UEs to the multiple wireless telecommunication networks,
    wherein a subscription profile among the multiple subscription profiles indicates a service is authorized to be provided to a UE, and
    wherein the authentication credentials are verified prior to providing the service to the UE; and
  reduce wireless telecommunication network traffic by:
    causing the multiple wireless telecommunication networks to store the IMSI range, the multiple subscription profiles, and the authentication credentials in multiple databases associated with the multiple wireless telecommunication networks; and obviating the need to initially connect to a home cellular telecommunications network of the UE by authorizing the multiple wireless telecommunication networks to authenticate the UE and provide the service to the UE based on information stored in the multiple databases instead of requesting authentication from the home cellular telecommunications network of the UE.

17. The system of claim 16, wherein the instructions to reduce the wireless telecommunication network traffic comprise instructions to:

cause the wireless telecommunication network among the multiple wireless telecommunication networks to receive a request from the UE to connect to the wireless telecommunication network, wherein the UE is roaming;

cause the wireless telecommunication network to authenticate the UE using the authentication credentials stored in a database associated with the wireless telecommunication network;

cause the wireless telecommunication network to determine that the service is authorized to be provided to the UE based on the subscription profile stored in the database; and cause the wireless telecommunication network to, upon authenticating the UE and determining that the service is authorized to be provided to the UE, provide the service to the UE.

18. The system of claim 16, comprising instructions to:

designate the subscription profile among the multiple subscription profiles to be a primary profile by enabling roaming based on the subscription profile, wherein the subscription profile is stored by the wireless telecommunication network among the multiple wireless telecommunication networks, wherein the wireless telecommunication network is configured to receive a request to approve a service requested by the UE from another wireless telecommunication network, wherein the wireless telecommunication network is configured to determine whether to provide the service requested based on a roaming profile associated with the UE, and wherein the wireless telecommunication network is configured to, upon determining that the service requested is included in the roaming profile, approve the service requested.

19. The system of claim 16, comprising instructions to:

authorize the wireless telecommunication network among the multiple wireless telecommunication networks to modify the subscription profile associated with the wireless telecommunication network by modifying the service authorized to be provided to the UE to obtain a modified subscription profile; and authorize the wireless telecommunication network to store the modified subscription profile in a database.

20. The system of claim 16, comprising instructions to:

define an IMSI range associated with multiple vehicles configured to communicate over the wireless telecommunication network;

distribute the IMSI range to the multiple wireless telecommunication networks; and distribute the multiple subscription profiles associated with the multiple wireless telecommunication networks, wherein a first subscription profile authorizes business-to-business services on a first wireless telecommunication communication network among the multiple wireless telecommunication networks, and wherein a second subscription profile among the multiple subscription profiles authorizes business-to-business services and vehicle-to-anything services on a second wireless telecommunication network among the multiple wireless telecommunication networks.

* * * * *